Feb. 10, 1931.  J. R. CAUTLEY  1,791,612
BRAKE OPERATING MECHANISM
Filed May 9, 1927
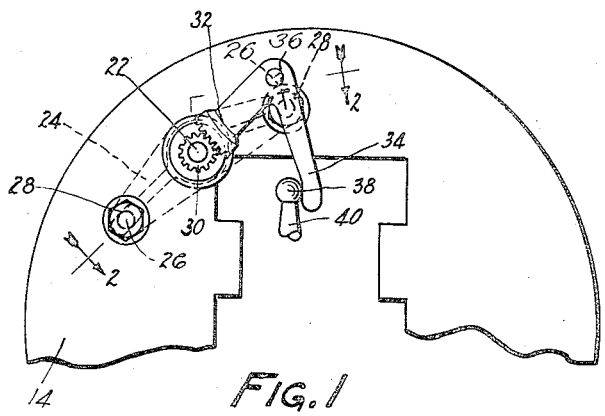
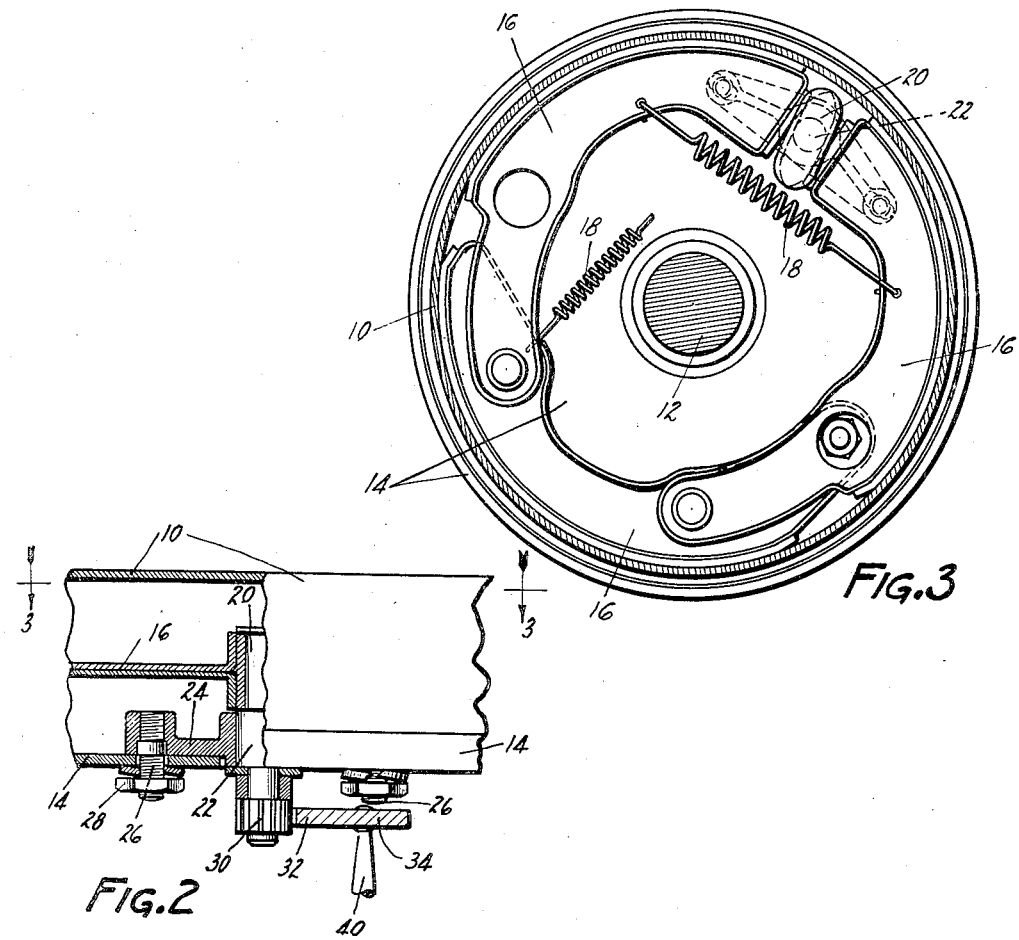
INVENTOR
JOHN R. CAUTLEY
BY
*M. W. McConkey*
ATTORNEY Patented Feb. 10, 1931

1,791,612

UNITED STATES PATENT OFFICE

JOHN R. CAUTLEY, OF SOUTH BEND, INDIANA, ASSIGNOR TO BENDIX BRAKE COMPANY, OF CHICAGO, ILLINOIS, A CORPORATION OF ILLINOIS

BRAKE-OPERATING MECHANISM

Application filed May 9, 1927. Serial No. 189,753.

This invention relates to brakes and is illustrated as embodied in novel operating mechanism for a front wheel automobile brake of the internal expanding type. An object of the invention is to provide a brake-applying device which is mounted in such a manner that it can shift to center itself, in combination with operating means which acts to apply the brake but which has no tendency to cause the applying device to shift. In one desirable arrangement, the cam-shaft or its equivalent is provided with a pinion which meshes with a rack on an operating lever, the rack preferably being so arranged as to direct its thrust on the pinion substantially at right angles to the direction of shifting.

The above and other objects and features of the invention, including various novel combinations of parts and desirable particular constructions, will be apparent from the following description of the illustrative embodiments shown in the accompanying drawings, in which:

Figure 1 is an inside elevation looking outwardly toward the backing plate of the brake of the left front wheel of an automobile, the parts being shown removed from the axle;

Figure 2 is a partial section on the line 2—2 of Figure 1, showing an arrangement permitting the brake-applying device to shift to center itself; and Figure 3 is a vertical section on the line 3—3 of Figure 2, showing the brake shoes in outside elevation.

The illustrated brake includes a rotable drum 10 carried by a wheel (not shown) rotating on the spindle 12 of a front wheel knuckle which is swivelled by the usual king-pin or the like at one end of the front axle. A backing plate or other stationary support 14 is arranged at the open side of the drum 10 and is secured in any desired manner to the front wheel knuckle. The brake proper includes a plurality of shoes 16 operated to apply the brake, against the resistance of suitable return springs 18, by means such as a double cam 20 operated by a cam-shaft 22 journalled in a bracket 24 having attaching bolts or studs 26 passing through slots in the backing plate 14. The bracket 24 is frictionally gripped in place by nuts 28 on the bolts 26 so that it may shift when the brake is applied to permit the cam 20 or its equivalent to center itself with respect to the brake shoes 16. The cam-shaft 22 is provided at the end with a pinion 30.

The brake is applied by a segmental rack 32 meshing with the pinion 30 in such a direction as to exert its thrust on the pinion in a direction substantially at right angles to the direction the bracket 24 shifts when the cam 20 centers itself. The rack 22 is formed as an integral part of a bell-crank lever 34 mounted on a pivot 36 carried by the backing plate 14 and which is operatively engaged at its lower end by an integral ball 38 formed on the end of a lever 40 fulcrumed on the axle (not shown). The center of the ball 38 is arranged, when the brake is applied, in or immediately adjacent the swivelling axis of the wheel. The meshing of the rack 32 with the pinion 30 is sufficiently loose so that there is no interference with the very small degree of shifting of the bracket 34 which is sufficient to permit the cam 20 to shift to compensate for unequal wear of the lining on the various shoes 16 by automatically centering itself with respect to those shoes.

While one illustrative embodiment has been described in detail, it is not my intention to limit the scope of the invention to that particular embodiment or otherwise than by the terms of the appended claims.

I claim:

1. Brake-operating mechanism, comprising, in combination, a brake-applying shaft having a pinion and arranged to shift to center itself when the brake is applied, and an operating lever formed with a segmental rack meshing with the pinion and applying its thrust to the pinion substantially at right angles to the direction of shifting of said shaft.

2. Operating mechanism for a brake on a swivelled wheel comprising, in combination, a brake-applying device at one side of the swivelling axis of the wheel and which is arranged to shift circumferentially of the brake to center itself when the brake is applied and which includes a pinion, and operating means including parts engaging each other substantially at the swivelling axis and a segmental rack meshing with the pinion and adapted to be actuated toward and away from the axis of the brake to rotate said pinion.

3. Operating mechanism for a brake comprising, in combination, a brake-applying device which is arranged to shift circumferentially of the brake to center itself when the brake is applied and which includes a shaft extending outside of the brake, said shaft having a pinion on its end, and operating means also arranged outside said brake including a segmental rack meshing with the pinion and adapted to be moved toward and away from the axis of the brake to rotate said pinion.

4. Brake mechanism comprising, in combination, a brake drum, a backing plate for the drum, retarding means mounted within the drum to be urged thereagainst, a support for an operating shaft carried by the backing plate and shiftable with respect to the plate to take up for wear of the retarding means, an operating shaft journaled in said support and shiftable therewith, a part carried by said shaft coupled with said retarding means to move it against the drum upon rotation of the shaft, a pinion carried by the shaft, a rack engaging said pinion, said rack positioned outside of the backing plate to rotate the pinion and movable in a line angularly with the shiftable line of the shaft.

In testimony whereof, I have hereunto signed my name.

JOHN R. CAUTLEY.